(12) United States Patent
Son et al.

(10) Patent No.: US 11,053,123 B2
(45) Date of Patent: Jul. 6, 2021

(54) METHOD OF PRODUCING CARBON NANOTUBES IN FLUIDIZED BED REACTOR

(71) Applicants: SK Innovation Co., Ltd., Seoul (KR); SK Global Chemical Co., Ltd., Seoul (KR)

(72) Inventors: Sung Real Son, Daejeon (KR); Ji Min Kim, Daejeon (KR); Min Ji Sung, Daejeon (KR); Sang Uk Kim, Daejeon (KR); Jung Yul Son, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 218 days.

(21) Appl. No.: 16/021,588

(22) Filed: Jun. 28, 2018

(65) Prior Publication Data

US 2019/0002285 A1  Jan. 3, 2019

(30) Foreign Application Priority Data

Jul. 3, 2017  (KR) .......................... 10-2017-0084234

(51) Int. Cl.
*C01B 32/162* (2017.01)
*B01J 8/24* (2006.01)
(Continued)

(52) U.S. Cl.
CPC .............. *C01B 32/162* (2017.08); *B01J 8/18* (2013.01); *B01J 8/20* (2013.01); *B01J 8/24* (2013.01);
(Continued)

(58) Field of Classification Search
CPC .............. C01B 32/162; C01B 2202/36; C01B 2202/06; C01B 32/16; C01B 32/158; C01B 32/159; C01B 32/164; C01B 32/166; C01B 32/168; C01B 32/17; C01B 32/172; C01B 32/174; C01B 32/176; C01B 32/178;
(Continued)

(56) References Cited

U.S. PATENT DOCUMENTS 6,413,487 B1 * 7/2002 Resasco ................ B01J 8/0055
423/447.3
7,651,668 B2  1/2010 Nakayama et al.
(Continued)

FOREIGN PATENT DOCUMENTS

JP   2007284317 A   11/2007
JP   2016108175 A   6/2016
(Continued)

OTHER PUBLICATIONS

Dasgupta, et al., Fluidized bed synthesis of carbon nanotubes—A review, Chemical Engineering Journal 2011; 171: 841-869 (Year: 2011).*

(Continued)

*Primary Examiner* — Daniel C. McCracken
(74) *Attorney, Agent, or Firm* — The Webb Law Firm

(57) ABSTRACT

Provided is a method of producing carbon nanotubes by supplying a catalyst and a carbon source to a fluidized bed reactor. The fluidized bed reactor has an expanded zone. A flow velocity (linear velocity) of a raw material supplied to (Continued)

the fluidized bed reactor is equal to or higher than a terminal velocity of an internal material in the fluidized bed reactor.

7 Claims, 6 Drawing Sheets

(51) Int. Cl.
*B01J 8/20* (2006.01)
*B01J 8/18* (2006.01)
*B82Y 30/00* (2011.01)
*B82Y 40/00* (2011.01)

(52) U.S. Cl.
CPC ...... *B01J 2208/00548* (2013.01); *B82Y 30/00* (2013.01); *B82Y 40/00* (2013.01); *C01B 2202/06* (2013.01); *C01B 2202/36* (2013.01); *C01P 2006/80* (2013.01)

(58) Field of Classification Search
CPC ............ C01B 2202/00; C01B 2202/02; C01B 2202/04; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; B01J 8/20; B01J 8/18; B01J 8/24; B01J 2208/00548; B01J 8/008; B82Y 30/00; B82Y 40/00; C01P 2006/80; C01P 2004/64
See application file for complete search history.

(56) References Cited

U.S. PATENT DOCUMENTS

| | | | |
|---|---|---|---|
| 9,050,572 B2 | 6/2015 | Buchholz et al. | |
| 2005/0042162 A1* | 2/2005 | Resasco | B01J 8/0055 |
| | | | 423/447.3 |
| 2006/0104887 A1* | 5/2006 | Fujioka | B82Y 30/00 |
| | | | 423/447.3 |
| 2007/0154382 A1* | 7/2007 | Edwin | B01J 4/002 |
| | | | 423/447.3 |
| 2008/0213138 A1 | 9/2008 | Nakayama et al. | |
| 2013/0017142 A1* | 1/2013 | Noda | B01J 8/007 |
| | | | 423/445 R |
| 2018/0002178 A1* | 1/2018 | Yoon | B01J 8/1809 |

FOREIGN PATENT DOCUMENTS

| | | |
|---|---|---|
| KR | 1020090013503 A | 2/2009 |
| KR | 1020090073346 A | 7/2009 |
| KR | 1020120001448 A | 1/2012 |
| KR | 1020140110100 A | 9/2014 |
| WO | WO 2016/144092 * 9/2016 | ............ C01B 31/02 |

OTHER PUBLICATIONS

Cocco, et al., Introduction to Fluidization, Chemical Engineering Progress pp. 21-29 (Nov. 2014) (Year: 2014).*

* cited by examiner

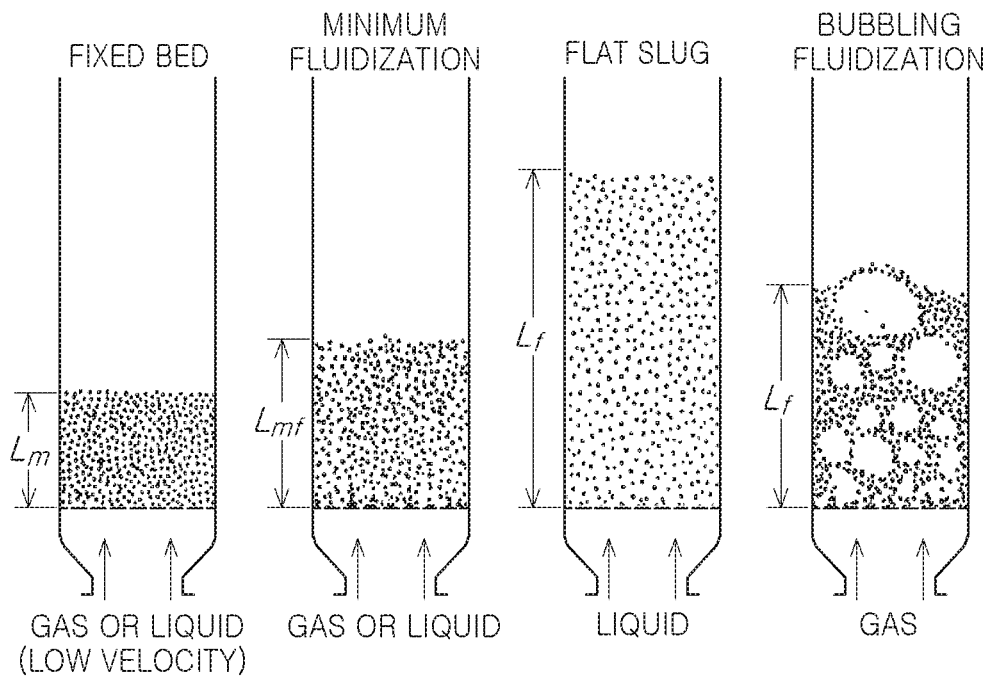
   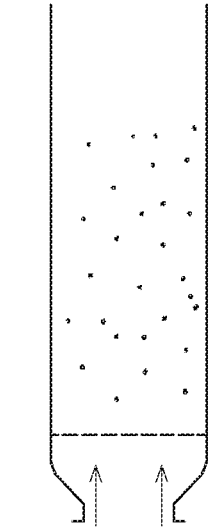
FIG. 1E   FIG. 1F   FIG. 1G   FIG. 1H

METHOD OF PRODUCING CARBON NANOTUBES IN FLUIDIZED BED REACTOR

CROSS-REFERENCE TO RELATED APPLICATION

This application claims priority to Korean Patent Application No. 10-2017-0084234 filed Jul. 3, 2017, the disclosure of which is hereby incorporated in its entirety by reference.

BACKGROUND OF THE INVENTION

Field of the Invention

The present disclosure relates to a method of producing carbon nanotubes in a fluidized bed reactor.

Description of Related Art

Carbon nanotubes, discovered by Dr. Iijima in 1991, are a carbon material having a tube shape and a diameter of several nanometers. Carbon nanotubes may be classified as single-walled carbon nanotubes, double-walled carbon nanotubes, or multi-walled carbon nanotubes, according to the number of rolled walls having a cylindrical shape thereof.

Single-walled carbon nanotubes may be structures simply rolled with a single wall of a sheet of graphite, and may have a diameter of 0.5 nm to 3 nm. Double-walled carbon nanotubes may be structures in which two walls of the single-walled carbon nanotube are concentric, and have a diameter of 1.4 nm to 3 nm. Multi-walled carbon nanotubes may be structures having a wall number of 3 to 15 plies and a diameter of 5 nm to 100 nm.

The carbon nanotubes may have relatively low resistance values due to a one-dimensional structure, and an electrical structure inherent to graphite. For example, a resistance value of the single-walled carbon nanotubes may be only $\frac{1}{100}$ of that of copper. In addition, a current carrying capacity of the carbon nanotubes may have a unique electrical characteristic, being 1,000 times that of copper. Furthermore, the carbon nanotubes may have an $sp^2$ bond between carbon and carbon, and thus, have relatively high stiffness and strength. The carbon nanotubes may be characterized in that a degree of thermal conductivity thereof is up to 2 times that of diamond, and the carbon nanotubes have excellent thermal stability up to 750° C. in the atmosphere.

The carbon nanotubes may have properties of a conductor or a semiconductor depending on a rolling shape. Further, an energy gap of the carbon nanotubes may vary, depending on a diameter thereof, and a unique quantum effect may be exhibited due to the one-dimensional structure thereof. Carbon nanotubes are under active research in the fields of displays, memory devices, hydrogen storage materials and nanocomposite materials, due to having such a unique structure and characteristics. Further, carbon nanotubes may be applied to electrical and electronic products by providing electrical conductivity to engineering plastic composites, and may be used as a high value-added material for electromagnetic wave shielding properties, antistatic properties, and the like.

Such carbon nanotubes may generally be expensive, and thus, carbon nanotubes are still required to be synthesized in large amounts at relatively low cost in order to be useful in various fields.

Carbon nanotubes may be synthesized through various methods, such as an electrical discharge method, a laser deposition method, a plasma chemical vapor deposition method, a thermo-chemical vapor deposition method, a vapor phase deposition method, or the like.

The electric discharge method may be carried out such that, when a discharge occurs between two electrodes, carbon clusters originating from a graphite rod used as a positive electrode are condensed and collected on a low temperature graphite electrode used as a negative electrode.

In the laser deposition method, graphite may be vaporized by irradiating a graphite target with a laser in an oven at 1200° C. The vaporized graphite may be adsorbed, condensed and collected on a collector. In the plasma chemical vapor deposition method, a substrate on which carbon nanotubes are to be grown (a material obtained by depositing a catalytic metal on Si, $SiO_2$, or a glass substrate) may be disposed on a lower electrode, a raw gas is supplied from a direction of an upper electrode, and a radio-frequency (RF) glow discharge is subjected to synthesizing a nanotube on the substrate. In the thermo-chemical vapor deposition method, carbon nanotubes may be synthesized by supplying a hydrocarbon gas to a substrate on which a catalytic metal is deposited in a reactor maintained at a synthesis temperature of the carbon nanotube.

However, the synthesis methods of carbon nanotubes using such techniques may have a disadvantage in that mass production is difficult. Meanwhile, synthesis methods of carbon nanotubes (KR2007-0141265, KR2007-0077714, JP2006-116111) using a fluidized bed reactor, or a synthesis technique (US 2005-663451) using a vertical chemical vapor deposition (CVD) apparatus for a continuous process is becoming popular recently, since they have advantages having a possibility for mass synthesis of carbon nanotubes.

The vertical CVD applied for mass production may have a drawback that the residence time is very short and it is difficult to control the residence time. However, the method of synthesizing carbon nanotubes on a surface of the catalyst while flowing the catalyst in the fluidized bed chamber using the carbon source gas may have various advantages, in that a residence time of the catalyst (synthesis time) may be controlled, and a mass production may be carried out.

However, a formation of the carbon nanotubes and properties of the formed carbon nanotubes may still depend largely on metal components or combination of various metal components used as a catalyst, a support material used, interaction, reactant gas, or partial pressure between the catalyst and the support material, mixing of hydrogen or additional gas, reaction temperature and residence time, and a reactor used, in a complex manner. Optimization of the manufacturing process is a particular challenge for industrial processes.

Generally, when manufacturing carbon nanotubes in a fluidized bed, it is common in the art to operate at a flow velocity equal to or lower than a terminal velocity $U_t$ to maintain a bubbling fluidization condition (cases of (b) to (d) in FIG. 1). The bubbling fluidization condition may be advantageous for stable operating conditions, since particles may not be scattered outside the bed, but there is still a limit to an increase in production of carbon nanotubes.

For example, in Korean Patent Laid-Open Publication No. 2014-0110100, it was intended to disclose a method of producing carbon nanotubes by setting a gas velocity in a fluidized bed reactor to be slower than a descending velocity of particles, or by using an apparatus for recycling exhausted particles.

Japanese Patent Laid-Open Publication No. 2016-0108175 discloses a process for producing carbon nanotubes from acetylene, wherein linear flow velocity of raw material gases is 20 cm/s or lower, more preferably 15 cm/s or lower, from viewpoint of peeling inhibition of carbon nanotubes.

In Korean Patent Laid-Open Publication No. 2012-0001448, a special fluidized bed reactor having a partition wall was intended to be used to manufacture carbon nanotubes.

SUMMARY OF THE INVENTION

An aspect of the present disclosure is to provide a method of producing carbon nanotubes having improved yield and purity.

According to an aspect of the present disclosure, a method of producing carbon nanotubes by supplying a catalyst and a carbon source to a fluidized bed reactor, wherein the fluidized bed reactor has an expanded zone, wherein a flow velocity (linear velocity) of a raw material supplied to the fluidized bed reactor is equal to or higher than a terminal velocity of internal materials in the fluidized bed reactor.

The flow velocity of the raw material may be decreased by an amount equal to or lower than the terminal velocity at the expanded zone.

The flow velocity of the raw material may be more than 10 times a minimum fluidization velocity of the internal materials.

The flow velocity of the raw material may be 20 cm/s or higher.

The carbon source may be one or more selected from the group consisting of saturated and unsaturated hydrocarbons having 1 to 4 carbon atoms.

The catalyst may be a metal catalyst.

The metal catalyst may be any one metal selected from the group consisting of iron (Fe), molybdenum (Mo), titanium (Ti), vanadium (V), chromium (Cr), manganese (Mn), nickel (Ni), cobalt (Co), copper (Cu), cadmium (Cd), zinc (Zn), ruthenium (Ru), lead (Pd), silver (Ag), platinum (Pt) and gold (Au), or any one selected from alloys thereof.

The carbon nanotubes may have a diameter of 0.4 nm to 10 nm.

The carbon nanotubes may be comprised of 1 to 10 layers.

BRIEF DESCRIPTION OF THE DRAWINGS

The above and other aspects, features, and advantages of the present disclosure will be more clearly understood from the following detailed description, taken in conjunction with the accompanying drawings, in which:

FIGS. 1A to 1H schematically illustrate systems of fluidized bed reactors;

DESCRIPTION OF THE INVENTION

Hereinafter, various exemplary embodiments in the present disclosure will be described with reference to the accompanying drawings. However, exemplary embodiments in the present disclosure may be variously modified, and the scope of the present disclosure is not limited to exemplary embodiments described below.

In the present disclosure, a fluidized bed reactor may be provided with an expanded zone, and a flow velocity (linear velocity) of a raw material supplied to the fluidized bed reactor is preferably equal to or higher than a terminal velocity of internal materials in the fluidized bed reactor.

In a case in which a flow velocity maintains a bubbling fluidization region, height of a bed of a dense phase may be relatively increased due to expansion of the bed. However, in a case of a gas flow velocity higher than the above-described velocity, scattering amounts of particles in carbon nanotubes (CNT) may be rapidly increased to maintain or slightly decrease the height of the thick phase, and to increase height including a transition region in which the dense phase and a lean phase are mixed. A flow velocity at which such a phenomenon begins to appear may be defined as a terminal velocity of the relevant CNT.

Figure 2A:
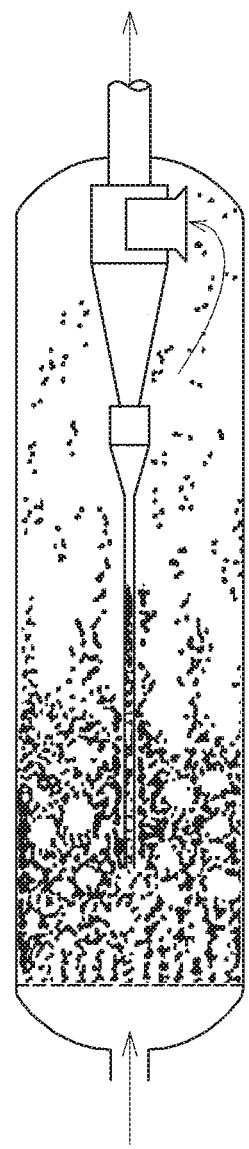
FIGS. 2A and 2B illustrate a case in which flow velocity in a fluidized bed reactor is relatively high.
Figure 2B:
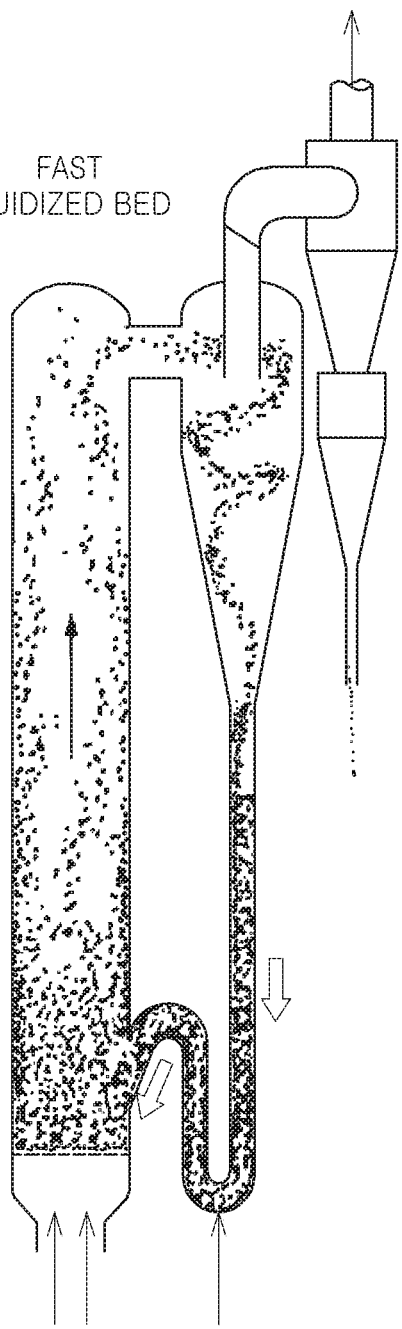
Figure 3:
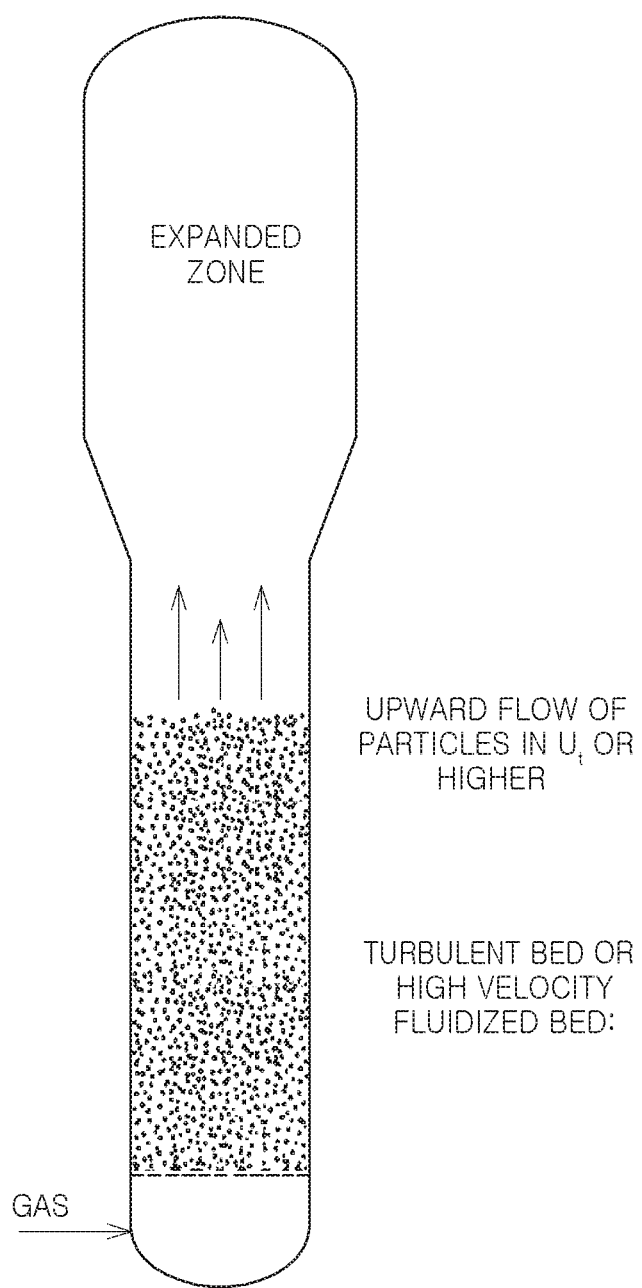
FIG. 3 schematically illustrates a fluidized bed reactor having an expanded zone.
Figure 4C:
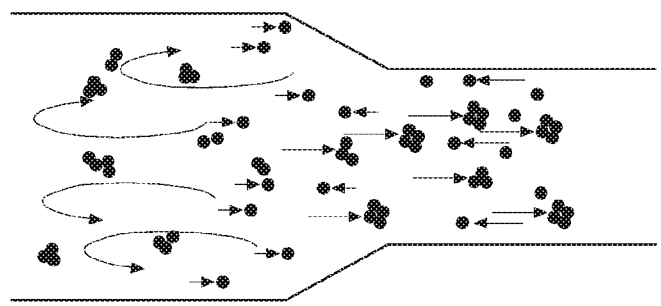
FIGS. 4A to 4C schematically illustrate a behavior of internal materials according to a flow velocity in a fluidized bed reactor having an expanded zone. The particles are scattered from the reaction bed by the flow velocity of the terminal velocity $U_t$ or higher (4A). In the expanded zone, the flow velocity is decreased below $U_t$ to flow the particles downward again, and the particles a par to also agglomerate together (4B). In the original reaction bed and the expanded zone, the upward and downward flows, and the condensation and dispersion of the particles are repeatedly and mixedly proceeded (4C)
Figure 4B:
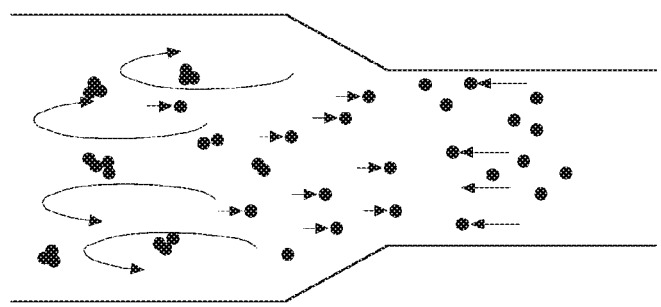
Figure 4A:
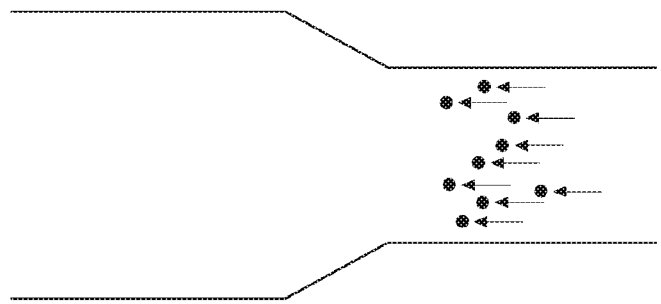

The flow regime in the reaction bed may be changed, when the flow velocity is rapidly increased higher than the bubbling fluidized velocity to be equal to or higher than the terminal velocity $U_t$ (cases of (g) to (h) in FIG. 1). For example, particles and fluids may be mixed more vigorously, and the particles may begin to scatter out of the bed (FIGS. 2 and 3). When the particles flowing upward to a dilute region (a portion with fewer particles at the top of the bed) enter the expanded zone, the flow velocity may decrease rapidly to fall within the condition being lower than the terminal velocity $U_t$, and then flow downward. It can be seen that such upward and downward flows are repeated (FIG. 4). In this case, the agglomeration and division of the internal materials may be repeated.

Figure 5:
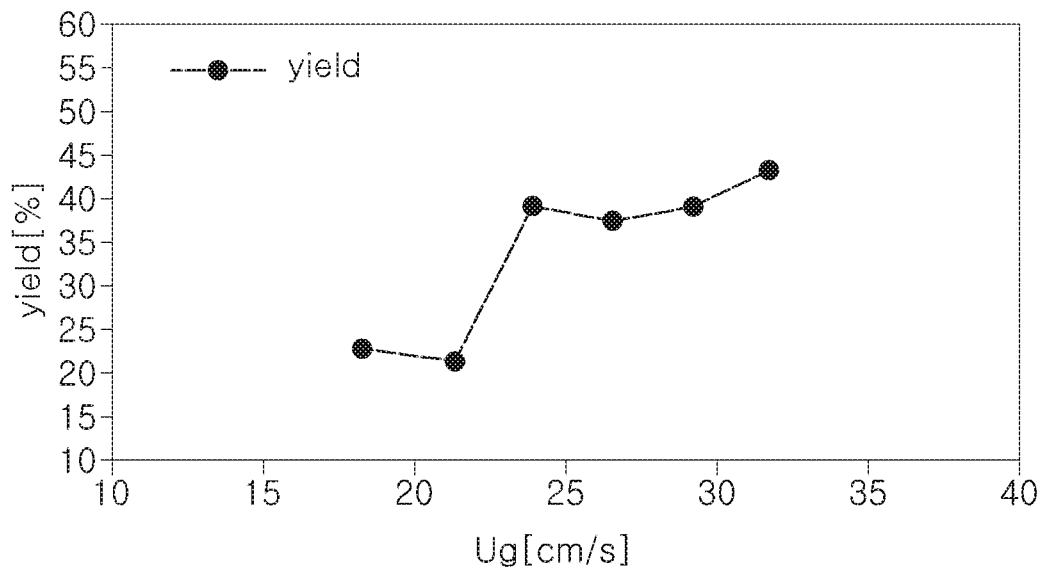
FIGS. 5 and 6 illustrate yield and amount of carbon nanotubes obtained from a fluidized bed reactor.
Figure 6:
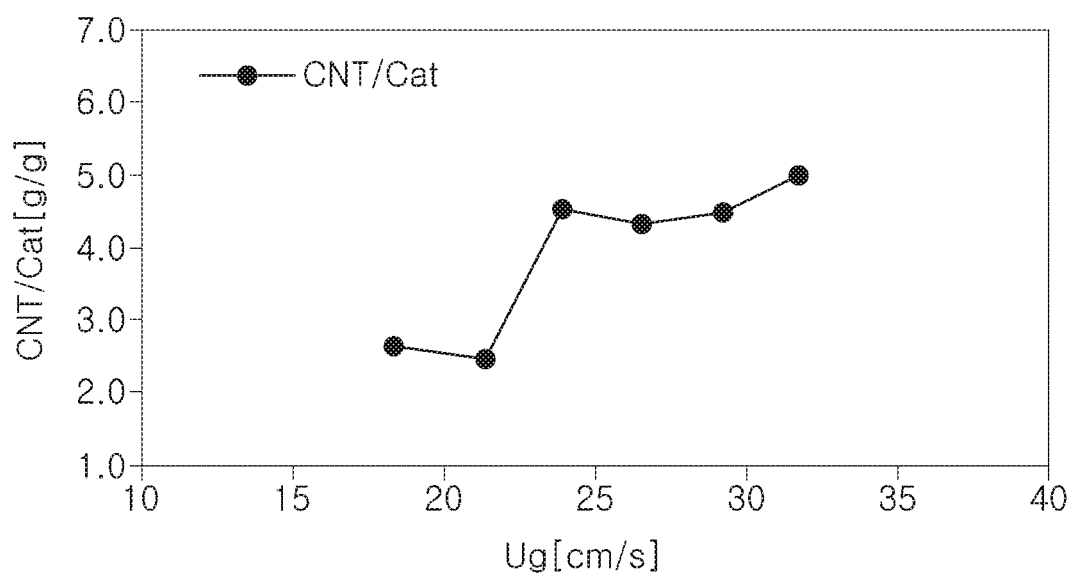
Figure 7:
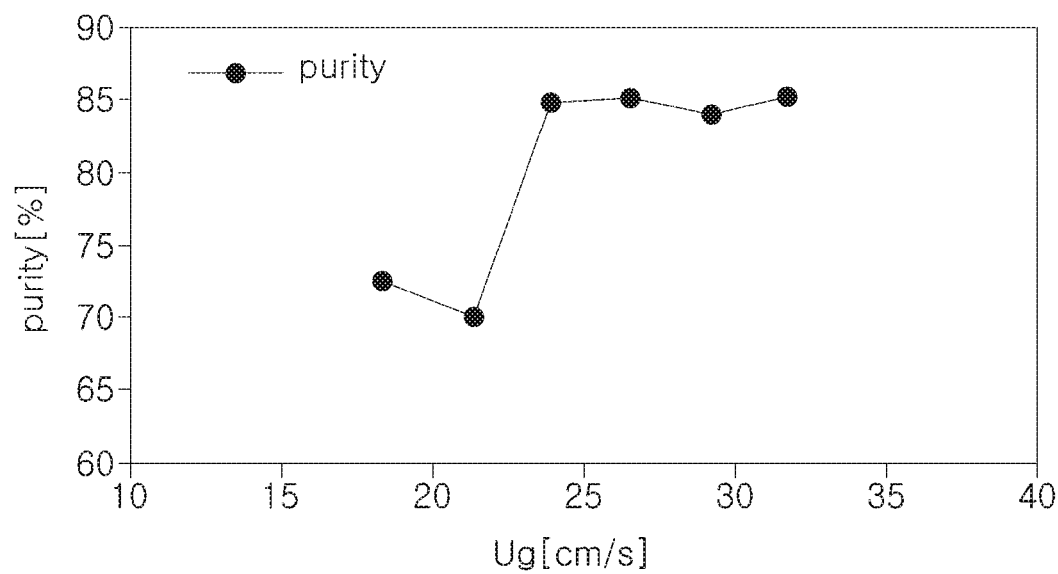
FIG. 7 illustrates a purity of carbon nanotubes obtained from a fluidized bed reactor.

When the effects on the fluidization velocity of the catalytic particles and particles of the prepared carbon nanotubes are similar to each other, for example, when a minimum fluidization velocity $U_{mf}$ and a terminal velocity $U_t$ are substantially similar to each other, in a case of the terminal velocity $U_t$ or higher, a mix characteristic may be good to dramatically increase yield of carbon nanotubes (FIGS. 5 and 6). Accordingly, it is preferable to operate the carbon nanotubes at the terminal velocity $U_t$ or higher to be advantageous in increasing the production amount, compared to the conventional flow velocity region.

The flow velocity of the raw material supplied to the fluidized bed reactor is not particularly limited as long as it is equal to or higher than the terminal velocity of the internal materials in the fluidized bed reactor. The flow velocity of the raw material is preferably not less than 10 times the minimum fluidization velocity, more particularly, the flow velocity of the raw material is preferably 20 cm/s or higher. Meanwhile, the upper limit thereto may vary according to the design criteria of the expanded zone, but it is preferable that the expanded zone has a flow velocity equal to or lower than the terminal velocity.

The fluidized bed reactor may produce carbon nanotubes at atmospheric pressure or at pressures in excess of the atmospheric pressure. The process may be carried out at an absolute pressure of 0.05 bar·g to 1.5 bar·g, with a pressure of 0.5 bar·g to 1.0 bar·g being particularly preferred.

The reactor may be heated externally, the temperature may vary in the temperature range from 300° C. to 1600° C. This temperature should be high enough to allow deposition of carbon by decomposition to occur at a sufficient rate, and should not result in significant self-pyrolysis of gaseous hydrocarbons. This will result in the resulting material having an undesirably high content of amorphous carbon. An advantageous temperature range may be 500° C. to 800° C., and a decomposition temperature of 500° C. to 600° C. is particularly preferable.

The catalyst may be reduced prior to entering an actual reaction chamber. The catalyst may be added primarily in the form of an oxide of a catalytically active metal, or even in the form of a precipitated hydroxide or carbonate. Transition metals or alloys thereof as broadly described in the literature referred to in the prior art may be generally suitable as a catalyst. In the present disclosure, it will be only mentioned some examples without limiting the general properties.

This method is preferably used for catalysts containing manganese, iron, cobalt and support materials, wherein iron, cobalt and manganese are contained in an amount of 2 mol % to 98 mol %, based on the content of the active component in metal form. Further preferably, this method is used for catalyst further comprising molybdenum.

The diameter of the catalyst supported on the support material is preferably 0.2 nm to 2000 nm, more preferably 10 nm to 1000 nm. The diameter of the catalyst may be measured by an atomic force microscope (AFM). As a combination of a catalyst supporting layer and the catalyst, from the viewpoint of productivity of carbon nanotubes, it is preferable that the catalyst supporting layer is $Al_2O_3$, and the catalyst is Fe. From the viewpoint of efficiently obtaining carbon nanotubes having a small diameter, it is preferable that the catalyst supporting layer is $Al_2O_3$, and the catalyst is Co.

The support is composed of heat resistant beads having heat resistance. As materials of the support, it is preferable to include one or more element selected from the group consisting of Si, Al, Mg, Zr, Ti, O, N, C, Mo, Ta and W. Specific examples of the materials may include oxides such as $SiO_2$, $Al_2O_3$ and MgO, nitrides such as $SiN_4$ and AlN, and carbides such as SiC, or the like. A complex oxide such as $Al_2O_3$—$SiO_2$ is also preferred.

The support preferably has a diameter of 100 μm to 2000 μm, more preferably 200 μm to 2000 μm. When the support has a diameter of 100 μm or more, the support tends to be stably supported in the reaction tube and to flow efficiently, and the support and the carbon nanotubes tend to be easily separated from the same reaction tube. In the meantime, when the diameter of the support is 2000 μm or less, the support tends to flow easily.

In one embodiment of the present disclosure, a catalyst supporting material on the support may be included. In some embodiments, the catalyst supporting layer may be formed on the support in the catalyst supporting operation, the catalyst may be supported on the catalyst supporting layer, or the catalyst may be supported on the support without the catalyst supporting layer.

The catalyst supporting material preferably contains one or more element selected from Si, Al, Mg, O, C, Mo and N. In particular, a precursor of the catalyst supporting material may be those for forming a catalyst supporting material layer containing an oxide such as $SiO_2$, $Al_2O_3$ or MgO, a nitride such as $Si_3N_4$ or AlN, or a carbide such as SiC. The precursor of the catalyst supporting material may also be a catalyst supporting material layer containing a composite oxide of $Al_2O_3$—$SiO_2$. In particular, it is preferable that the precursor of the catalyst supporting material may form a catalyst supporting layer composed of $Al_2O_3$ from the viewpoint of stability of the catalyst particles. Specific examples of the precursor of the catalyst may include alkoxide such as aluminum isopropoxide and aluminum sec-butoxide, alkyl aluminum such as triethyl aluminum and triisobutyl aluminum, and aluminum chloride, and the like.

An average thickness of the catalyst supporting layer formed on the support is preferably 1 nm to 100 nm, more preferably 1 nm to 50 nm. When the thickness of the catalyst supporting layer is 1 nm or more, the catalyst particles may be stably supported on the catalyst supporting layer, Ostwald ripening may be not easily generated, and the carbon nanotubes tend to grow in a longitudinal direction. Meanwhile, when the thickness of the catalyst supporting layer is 100 nm or less, the catalyst particles may be less likely to be received in the catalyst supporting layer during synthesis, and the carbon nanotubes tend to grow in a longitudinal direction.

For the production of carbon nanotubes, aliphatic hydrocarbons, and light gaseous hydrocarbons such as olefins may be decomposed individually or as a mixture. However, alcohols, carbon oxides, in particular CO, heteroaromatic and aromatic compounds and functionalized hydrocarbons, such as aldehydes or ketones, may be used as long as they decompose on the catalyst. Mixtures of the hydrocarbons described above may also be used.

Particularly suitable reactant gases may include, for example, methane, ethane, propane, butane or higher molecular weight aliphatics, ethylene, propylene, butene, butadiene or higher molecular weight olefins, or aromatic hydrocarbons or oxides of carbon, or hydrocarbons having alcohols or heteroatoms. For example, aliphatic or olefinic hydrocarbons each having 1 or 2 to 10 carbon atoms, or 1 nuclear or 2 nuclear aromatic hydrocarbons are preferably used. Aliphatic ($C_xH_{2x+2}$) and olefin ($C_xH_y$) having a carbon number x of 1 to 4, or 2 to 4, respectively, are particularly preferably used.

In carrying out the process, the gaseous mixture may be passed through a suitable gas distributor to an apparatus disposed on a lower end of a reactor, by adding an inert gas such as, for example, nitrogen, hydrogen or argon. The molar ratio of the inert gas in the gas mixture is preferably 0.1 to 0.5.

Hereinafter, preferred embodiments of the present disclosure will be described with reference to the accompanying drawings. The embodiments of the present disclosure may be modified into various other forms, and the scope of the present disclosure is not limited to the embodiments described below.

Example

A fluidized bed reactor used for a reaction comprises an inlet portion extending linearly in the vertical direction and having an inner diameter of 0.15 m and a length of 2.0 m, an expanded zone slantedly connected to the inlet portion and having an inner diameter of 0.30 m and a length of 0.65 m, a dispersion plate formed with a through hole having an inner diameter of 25 mm to discharge carbon nanotubes (CNT), after end of reaction, and a structure in which gas is supplied at a lower end of the dispersion plate and gas is discharged at an upper end of the dispersion plate. Further, the heating portion is a heating device for covering the predetermined height position of the inlet portion and the expanded zone to heat the inlet portion and the expanded zone.

A catalyst having a particle size of 130 microns and a density of 1300 kg/m3, in which iron and cobalt were supported on an $Al_2O_3$ support, was charged to a fluidized bed reactor having the structure shown in FIG. 3. The temperature of the catalyst in the reactor was maintained at 690° C., and hydrogen (molar ratio of 0.2) and ethylene as inert gases were introduced into the reactor at a temperature of 530° C. The physical properties of the catalysts and carbon nanotubes used are shown in Table 1.

As a result of confirming the hydraulic characteristics in the cold model, the Ut value is expected to be 22 to 24 cm/s. As the flow regime is expected to change around this flow velocity, the reaction was carried out for 30 minutes while changing the fluidization velocity of the hydrocarbons and the catalyst as described in Table 2.

As the flow velocity increases, and the flow rate increases (i.e., the higher the fluidization velocity), the reaction pressure in the same system slightly increases in a proportional relation. 250 g of carbon nanotubes manufactured by the same method were filled to perform a smooth fluidization. The catalyst was filled to maintain the same specific velocity according to the flow velocity.

TABLE 1

|  | Catalyst | Carbon Nanotubes |
| --- | --- | --- |
| Size [micron] | 130 | 400 |
| Particle Density [kg/m$^3$] | 1300 | 150 |

TABLE 2

| Conditions | Value | | | | | |
| --- | --- | --- | --- | --- | --- | --- |
| Initial Catalyst Temperature [° C.] | 690 | | | | | |
| Reaction Time [min] | 30 | | | | | |
| Molar Ratio of Inert Gas (Hydrogen) (mol Ratio) | 0.2 | | | | | |
| Feed Temperature [° C.] | 530 | | | | | |
| Fluidization Velocity [cm/s] | 18 | 21 | 24 | 26 | 29 | 32 |
| Reaction Pressure [bar.g] | 0.2 | 0.3 | 0.3 | 0.4 | 0.5 | 0.6 |
| Yield [%] | 22.7 | 21.3 | 39.2 | 37.4 | 39.0 | 43.2 |
| Carbon nanotubes per Catalyst [g] | 2.6 | 2.5 | 4.5 | 4.3 | 4.5 | 5.0 |
| Carbon nanotubes Purity [%] | 72.5 | 70.1 | 84.8 | 85.1 | 84.0 | 85.2 |

As a result of the reaction experiment, it was confirmed that the yield and the amount of carbon nanotubes per catalyst were dramatically increased when the value was lower than the predicted Ut value (see FIGS. 4 and 5). It was confirmed that the purity of the final product largely changed from this point as well (see FIG. 6).

According to the present disclosure, in a case that carbon nanotubes are produced through a catalytic reaction in a fluidized bed, when the flow velocity is raised in the turbulent or fast fluidization region higher than the bubbling fluidization region, the yield, and the purity of the carbon nanotubes may be remarkably increased.

While exemplary embodiments have been shown and described above, it will be apparent to those skilled in the art that modifications and variations could be made without departing from the scope of the present disclosure as defined by the appended claims.

What is claimed is:

1. A method of producing carbon nanotubes by supplying a catalyst and a carbon source to a fluidized bed reactor,
   wherein the fluidized bed reactor has an expanded zone,
   wherein a linear flow velocity of a raw material supplied to the fluidized bed reactor is equal to or higher than a terminal velocity of internal materials in the fluidized bed reactor,
   wherein the linear flow velocity of the raw material is equal to or more than 25 times a minimum fluidization velocity of the internal materials, and
   wherein the linear flow velocity of the raw material in the expanded zone is less than the terminal velocity of the internal materials.

2. The method according to claim 1, wherein the flow velocity of the raw material is 20 cm/s or higher.

3. The method according to claim 1, wherein the carbon source is one or more selected from the group consisting of saturated and unsaturated hydrocarbons having 1 to 4 carbon atoms.

4. The method according to claim 1, wherein the catalyst is a metal catalyst.

5. The method according to claim 4, the metal catalyst is any one metal selected from the group consisting of iron (Fe), molybdenum (Mo), titanium (Ti), vanadium (V), chromium (Cr), manganese (Mn), nickel (Ni), cobalt (Co), copper (Cu), cadmium (Cd), zinc (Zn), ruthenium (Ru), lead (Pd), silver (Ag), platinum (Pt) and gold (Au), or any one selected from alloys thereof.

6. The method according to claim 1, wherein the carbon nanotubes have a diameter of 0.4 nm to 10 nm.

7. The method according to claim 1, wherein the carbon nanotubes are comprised of 1 to 10 layers.

* * * * *